United States Patent [19]

Justice

[11] Patent Number: 5,078,862
[45] Date of Patent: Jan. 7, 1992

[54] WASHER STANDPIPE DRAIN VISUAL FILTER

[76] Inventor: Ralph R. Justice, 1242 Joan Dr., Hamilton, Ohio 45013

[21] Appl. No.: 683,727

[22] Filed: Apr. 11, 1991

[51] Int. Cl.⁵ .............................................. B01D 35/02
[52] U.S. Cl. ........................................ 210/94; 4/288; 4/652; 4/DIG. 7; 4/DIG. 14; 68/208; 210/232; 210/463; 210/500.1; 285/117
[58] Field of Search ............... 68/208, 18 F; 210/94, 210/232, 409, 444–446, 459, 449, 460–463, 482, 497.01, 500.1, 507; 4/288, 652, DIG. 7, DIG. 14; 285/117, 236, 242, 249

[56] References Cited

U.S. PATENT DOCUMENTS

| | | | |
|---|---|---|---|
| 1,231,356 | 6/1917 | Houge | 4/DIG. 14 |
| 2,922,526 | 1/1960 | Ohmann | 68/208 |
| 3,804,258 | 4/1974 | Okuniewski et al. | 210/460 |
| 3,959,138 | 5/1976 | Nichols | 210/94 |
| 4,123,361 | 10/1978 | Marschmann | 210/463 |
| 4,138,747 | 2/1979 | Zijlstra | 68/208 |
| 4,217,667 | 8/1980 | Whitehouse | 210/482 |
| 4,806,241 | 2/1989 | Holien | 210/463 |
| 4,906,367 | 3/1990 | Villagomez | 68/18 F |
| 4,970,880 | 11/1990 | Luger | 210/460 |

Primary Examiner—Robert A. Dawson
Assistant Examiner—Joseph Drodge

[57] ABSTRACT

A washing machine lint trap attachable to the distal end of a washing machine drain hose. A transparent tube embodies a nylon trap secured to sized members to form a slip fit between the washing machine drain hose and the drain standpipe, the assembly further having a wire loop insertable into the standpipe, the loop being sized to retain the nylon trap between the drain hose and drain standpipe.

1 Claim, 1 Drawing Sheet

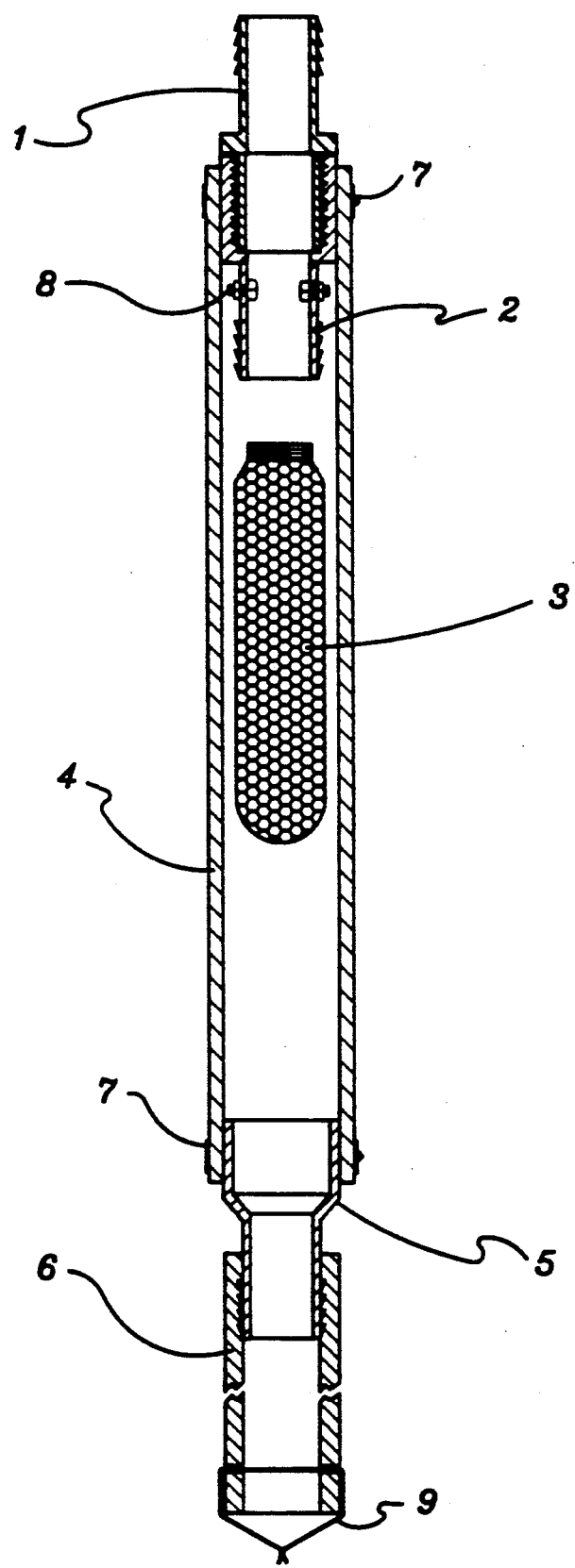

WASHER STANDPIPE DRAIN VISUAL FILTER

BACKGROUND—FIELD OF INVENTION

Lint traps have been used for many years, being nylon bags, stockings, shredded aluminum traps, etc., being confined to drain tub applications only. However, it is apparent that the standpipe drain application has gone unaccommodated allowing sewer lines and septic systems to become restricted or blocked on occasions, resulting in unwanted drain cleaning expense.

In searching prior claims, U.S. Pat. No. 4,566,970 washing machine filter appeared to be nearest comparison; also not being of standpipe application.

BRIEF DESCRIPTION OF THE DRAWINGS

The FIGURE is a diagram, partially in block form showing a system embodying the invention.

DETAILED DESCRIPTION OF THE PREFERRED EMBODIMENT

The device being of straight through design, adapts to any American made domestic washing machine, is for the purpose of catching lint from the washer discharge hose, prior to entry into a standpipe drain without reducing the flow rate of the drain cycle.

A transparent polyurethane tube houses a perforated nylon net bag which traps the lint. With the see-through design, easy monitoring of the device can be achieved as it can be seen just above the top of the washer as it enters the standpipe drain. The inlet is formed by a one inch male P.V.C. threaded adapter being joined to a one inch (1") female threaded adapter. This establishes an enclosed ribbed nipple for mounting the open end nylon perforated bag, with an elastic collar. Two stainless one half inch×six thirty seconds inch ($\frac{1}{2}$×6/32") screws with nuts, through each side of upper section of enclosed nipple, add extra security of the lint trap. The outside ribbed nipple of this union then provides a slip fit to the inside of washer drain hose outlet. A four inch×seven eights (4"×$\frac{7}{8}$") rubber hose adapter is provided in the event outlet end of washer drain hose is solid plastic or aluminum which appears on some makes.

The lint bag (or trap) is folded lengthwise for insertion into flexible "poly" enclosure tube. When pushed into form fit tube, the enlarged threaded body of the female adapter is held water tight by a two inch (2") stainless clamp.

The outlet end is acquired by insertion of a single female P.V.C. threaded adapter with ribbed nipple to the outside of sealed tube. Another water tight seal is formed when the threaded body of the female adapter is clamped by another two inch (2") hose clamp.

A six by seven eighths inch (6"×$\frac{7}{8}$") rubber hose tailpiece is slip fit to the outlet ribbed end of the adapter to form a drop in fit to a one and one half inch (1$\frac{1}{2}$") or two inch (2") standpipe receptacle pipe. A clamp is not required for a rubber hose to ribbed adapter connection.

With the thirteen inch by one and one half inch (13"×1$\frac{1}{2}$") I.D. "poly" tube the drain hose is basically enlarged at the end to accommodate an enclosed filter or trap assembly.

Despite see-through design, if user chooses to allow lint trap to become clogged, all the water will not be expelled during the washer drain cycle. Upon extensive testing there are no ill effects to be encountered with the use of this device. A clogged trap could only equal such consequence as a failed pump or blocked hose in another part of the machine.

A final security measure of maintaining lint bag is a stainless fourteen (14) gauge wire loop in the end of rubber tailpiece prior entry to drain, disallowing any chance of dispensing bag.

The top clamp may be loosened and lint bag easily removed for cleaning by turning inside out to remove lint, or just dispose and install new bag if so desired.

I claim:

1. A washing machine lint trap comprising: a lint trap assembly constructed, sized and having elements allowing a slip fit insertion between a washing machine drain hose and a drain standpipe, the assembly having a nylon trap enclosed in a transparent tube, the assembly further having a wire loop insertable into the standpipe, the loop being sized to retain the assembly trap between the drain hose and drain standpipe.

* * * * *